US012679088B2

(12) United States Patent
Morimoto

(10) Patent No.: US 12,679,088 B2
(45) Date of Patent: Jul. 14, 2026

(54) HEAD MODULE

(71) Applicant: BROTHER KOGYO KABUSHIKI KAISHA, Nagoya (JP)

(72) Inventor: Itsuki Morimoto, Inazawa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 155 days.

(21) Appl. No.: 18/610,981

(22) Filed: Mar. 20, 2024

(65) Prior Publication Data

US 2024/0326423 A1 Oct. 3, 2024

(30) Foreign Application Priority Data

Mar. 28, 2023 (JP) ................................ 2023-050877

(51) Int. Cl.
*B41J 2/14* (2006.01)
*B41J 2/175* (2006.01)

(52) U.S. Cl.
CPC ............ *B41J 2/1408* (2013.01); *B41J 2/175* (2013.01)

(58) Field of Classification Search
CPC .. B41J 2/04531; B41J 2/04538; B41J 2/0454; B41J 2/04553; B41J 2/04565; B41J 2/1408; B41J 2002/14354; B41J 2202/08; B41J 2/17509; B41J 2/04563; B41J 2002/14362; B41J 2/18; B41J 29/13; B41J 29/377
See application file for complete search history.

(56) References Cited

U.S. PATENT DOCUMENTS

2018/0029362 A1 2/2018 Sugiura
2018/0311958 A1 11/2018 Ishizaki
2019/0126649 A1 5/2019 Midorikawa et al.
2019/0315138 A1 10/2019 Iijima et al.

FOREIGN PATENT DOCUMENTS

JP 2007-320186 A 12/2007
JP 2019-181855 A 10/2019

OTHER PUBLICATIONS

Extended European Search Report for the corresponding European Patent Application No. 24162544.1 dated Aug. 8, 2024.

*Primary Examiner* — Kristal Feggins
(74) *Attorney, Agent, or Firm* — Kenealy Vaidya LLP

(57) ABSTRACT

A head module includes: a head chip having a nozzle plate and an IC; a cooler which is in thermal contact with the IC and which is configured to cool the IC; and a supplying device fluidly connected to the head chip and configured to supply ink to the head chip. In a first direction orthogonal to the nozzle plate, the cooler and the supplying device are positioned on one side with respect to the nozzle plate, the cooler and the supplying device are overlapped as seen from the first direction, and the cooler and the supplying device are thermally isolated from each other.

17 Claims, 8 Drawing Sheets

HEAD MODULE

REFERENCE TO RELATED APPLICATIONS

This application claims priority from Japanese Patent Application No. 2023-050877 filed on Mar. 28, 2023. The entire content of the priority application is incorporated herein by reference.

BACKGROUND ART

Conventionally, there are known heads each provided with a cooling channel configured to allow coolant (cooling medium) to flow therethrough, and an ink channel configured to supply and recover ink.

SUMMARY

In one head, insulation between the cooling channel and the ink channel is not considered. Accordingly, there is such a possibility that heat might be transferred from the ink flowing in the ink channel to the coolant flowing in the cooling channel, and that the temperature of the ink might be lowered thereby.

In another head, a cooler formed with a cooling channel and a supplying device formed with an ink channel are arranged side by side in a direction parallel to a nozzle surface of the head. Accordingly, it is difficult to miniaturize the head in the direction parallel to the nozzle surface.

The present teaching is made to solve the above-described problems, and an object of the present teaching is to provide a head module which is capable of preventing any lowering in the temperate of the ink flowing in the ink channel that would be otherwise caused due to the coolant flowing in the cooling channel, and which is miniaturized in a plane direction parallel to a nozzle plate.

According to an aspect of the present teaching, there is provided a head module including: a head chip having a nozzle plate and an IC; a cooler which is in thermal contact with the IC and which is configured to cool the IC; and a supplying device fluidly connected to the head chip and configured to supply ink to the head chip, wherein in a first direction orthogonal to the nozzle plate, the cooler and the supplying device are positioned on one side with respect to the nozzle plate, the cooler and the supplying device are overlapped as seen from the first direction, and the cooler and the supplying device are thermally isolated from each other.

According to the head module of the present teaching, it is possible to prevent the lowering in the temperate, of the ink flowing in the ink channel, which would be otherwise caused due to the coolant flowing in the cooling channel, and it is possible to miniaturize the head module in the plane direction parallel to the nozzle plate.

DESCRIPTION

In the following, an explanation will be given regarding a head module 1 according to an embodiment of the present teaching, with a case wherein the head module 1 is used in a printer (printing apparatus) 1000, as an example.

[Printer 1000]

Figure 1:
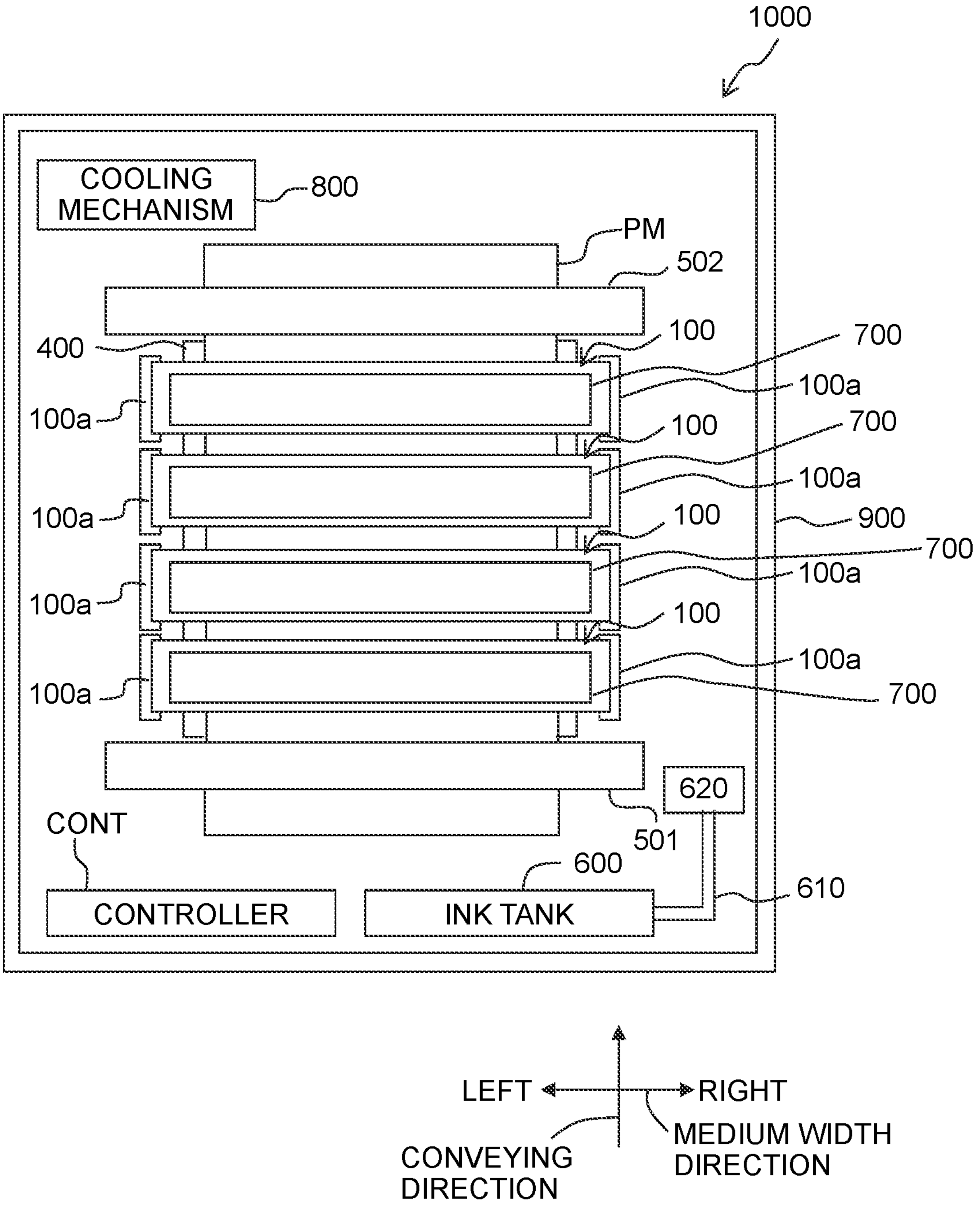
FIG. 1 is a plan view of a printer.

As depicted in FIG. 1, the printer 1000 is provided with four head unites 100, a platen 400, a pair of conveying rollers 501 and 502, a controller CONT and a casing 900 configured to accommodate the above-described components or elements. In the casing 900, an ink tank 600, four sub tanks 700 and a cooling mechanism 800 are further accommodated.

In the following explanation, a direction in which the pair of conveying rollers 501 and 502 are arranged, namely, a direction in which a medium PM is conveyed during an image formation is referred to as a conveying direction in the printer 1000. With respect to the conveying direction, an upstream side and a downstream side in the direction in which the medium PM is conveyed are referred, respectively, to as a supply side and a discharge side of the conveying direction.

Further, a direction in a horizontal plane orthogonal to the conveying direction, namely, a direction in which a rotational shaft of each of the conveying rollers 501 and 502 extends, is referred to as a medium width direction. With respect to the medium width direction, a left side and a right side in a case of seeing the discharge side from the supply side of the conveying direction are referred, respectively, to a left side and a right side of the medium width direction. A direction orthogonal to the conveying direction and the medium width direction is referred to as an up-down direction. The up-down direction is an example of a "first direction" of the present teaching.

Each of the four head units 100 is a head of a so-called line type, and is supported by a supporting body 100*a* at both ends thereof in the medium width direction. In the present embodiment, the four head units 100 eject, respectively, inks of mutually different colors. Four color inks ejected by the four head units 100, respectively, are exemplified as a cyan ink, a magenta ink, a yellow ink and a black ink. The specific configuration and function of each of the four head units 100 will be described later on.

The platen 400 is a member which is plate-shaped and which is configured to support the medium PM from a side opposite to the four head units 100 (lower side) in a case that the ink is ejected from the head units 100 toward the medium PM. The width in the medium width direction of the platen 400 is greater than a width of a medium which is largest and on which an image recording by the printer 1000 is possible.

The pair of conveying rollers 501 and 502 are positioned in such a state that the pair of conveying rollers 501 and 502 sandwich the platen 400 therebetween in the conveying direction. The pair of conveying rollers 501 and 502 feed the medium PM to the discharge side of the conveying direction, in a predetermined aspect, during the image formation to the medium PM by the head units 100.

The ink tank 600 is partitioned into four parts so that the four color inks are accommodatable therein. Each of the four sub tanks 700 are positioned at a location above one of the four head units 100.

The four color inks are fed to a reservoir 620 by a pipeline 610. Each of the pipeline 610 and the reservoir 620 is partitioned into four parts so that the four color inks can be circulated and accommodated. Each of the four color inks fed to the reservoir 620 is circulated, via a non-illustrated pipeline and a non-illustrated pump, between one of the four sub tanks 700 and the reservoir 620.

Each of the four sub tanks 700 supplies an ink (one of the four color inks) to a head unit 100 included in the four head units 100 and positioned immediately therebelow and recovers the ink from the head unit 100. Note that a heater (not illustrated in the drawings) is provided on each of the four sub tanks 700. The heater heats the ink which is to be supplied to one of the head units 100 up to a temperature suitable for the ink to be ejected from the head unit 100.

The cooling mechanism 800 is provided so as to cause coolant (cooling medium) to circulate to thereby cool a head chip 10 (to be described later on) provided on each of the head units 100. The cooling mechanism 800 mainly has a coolant tank, a pump, a coolant supplying tube and a coolant recovering tube (each of which is not depicted in the drawings). The cooling mechanism 800 causes the coolant to circulate between the coolant tank and the head module 1 (see FIG. 2) possessed by each of the head units 100, via the coolant supplying tube and the coolant recovering tube. In the present embodiment, cooling water is used as the coolant.

The controller CONT is configured to entirely control the respective parts or components provided on the printer 1000 so as to cause the respective parts or components to execute the image recording with respect to the medium PM, etc. The controller CONT is provided with: a FPGA (Field Programmable Gate Array), an EEPROM (Electrically Erasable Programmable Read-Only Memory; EEPROM is a registered trade mark of Renesas Electronics Corporation), a RAM (Random Access Memory), etc. Note that the controller CONT may be provided with a CPU (Central Processing Unit) or an ASIC (Application Specific Integrated Circuit), etc. The controller CONT is connected to an external apparatus or device such as a PC (not depicted in the drawings) to be capable of performing data communication therewith, and is configured to control the respective parts or components of the printer 1000 based on print data transmitted from the external apparatus.

[Head Unit 100]

Since the four head units 100 have a same configuration, one of the four head units 100 will be representatively explained in the following.

Figure 2:
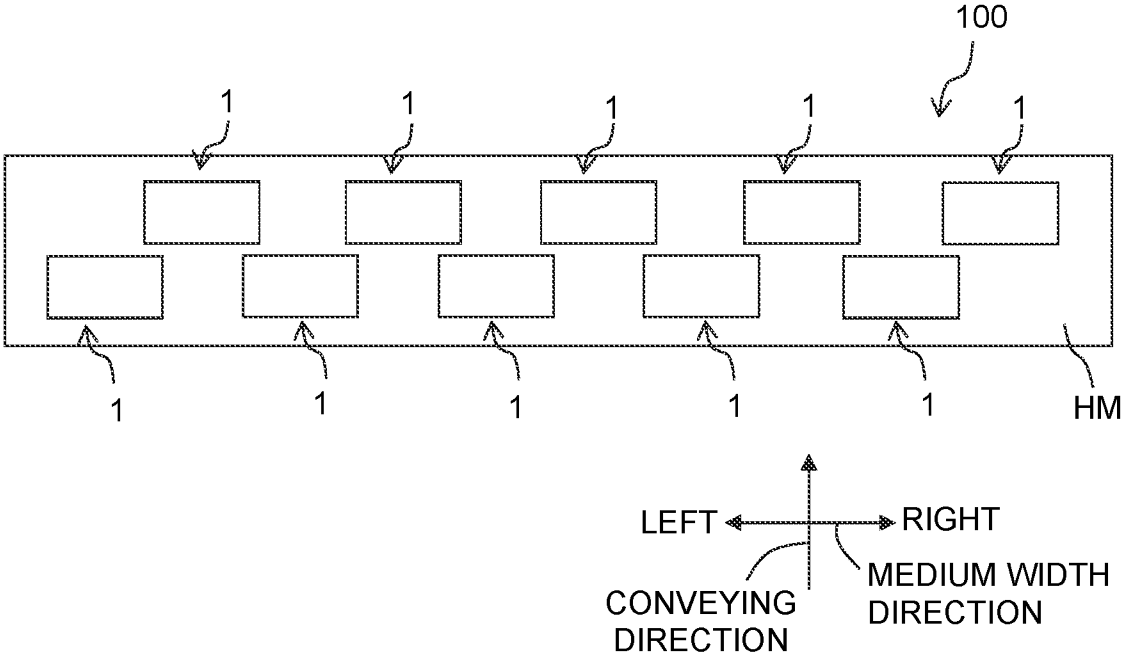
FIG. 2 is a top view of a head unit.

As depicted in FIG. 2, the head unit 100 is provided with a holding member HM and ten head modules 1 held by the holding member HM.

The holding member HM is a plate-shaped member which has a rectangular shape in a plan view and in which the medium width direction is a longitudinal direction and the conveying direction is a short direction. Both end parts in the longitudinal direction of the holding member HM are supported by the supporting body 100*a*.

The ten head modules 1 are integrally held by the holding member HM in a state that each of the ten head modules 1 is positioned in one of a plurality of opening parts (not depicted in the drawings) of the holding member HM. The ten head modules 1 are positioned, in a plan view, in a staggered manner (a zig-zag manner) along the medium width direction.

[Head Module 1]

Since the ten head modules 1 have a same configuration, one of the ten head modules 1 will be representatively explained in the following.

Figure 3:
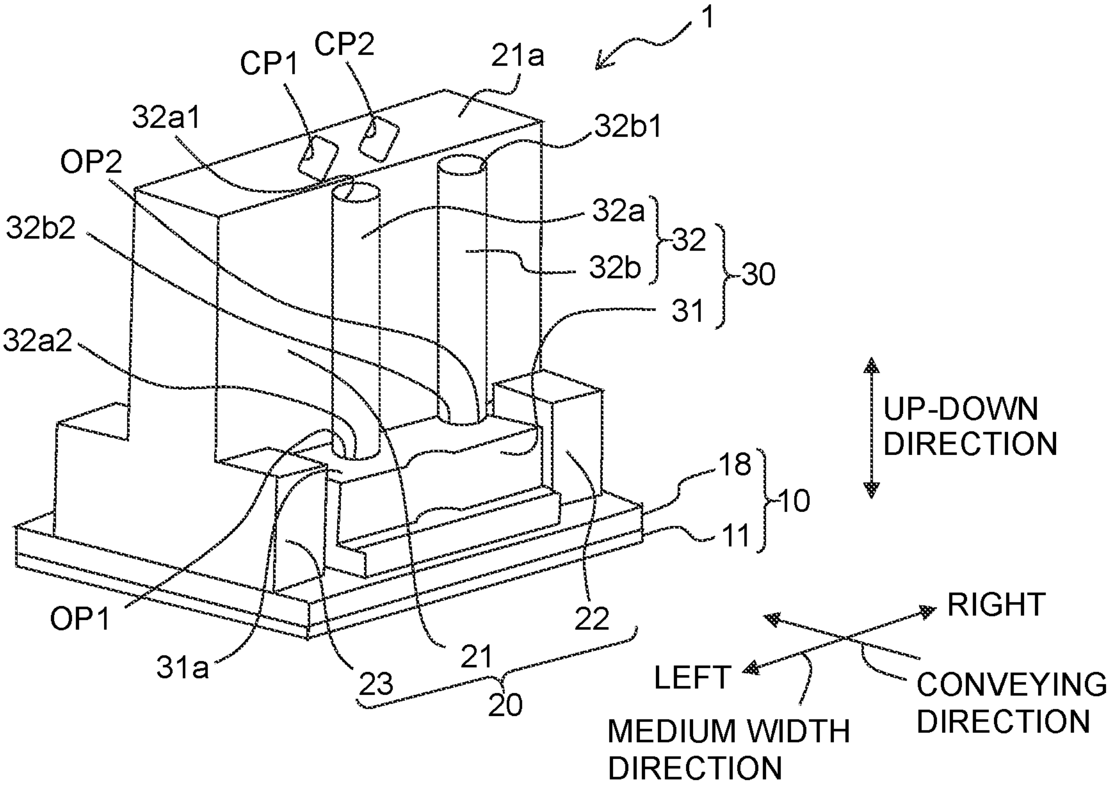
FIG. 3 is a perspective view of a head module.

As depicted in FIG. 3, the head module 1 has a head chip 10, an ink supplying device 20 configured to supply ink to the head chip 10, and a cooler 30 configured to cool the head chip 10.

[Head Chip 10]

Figure 4:
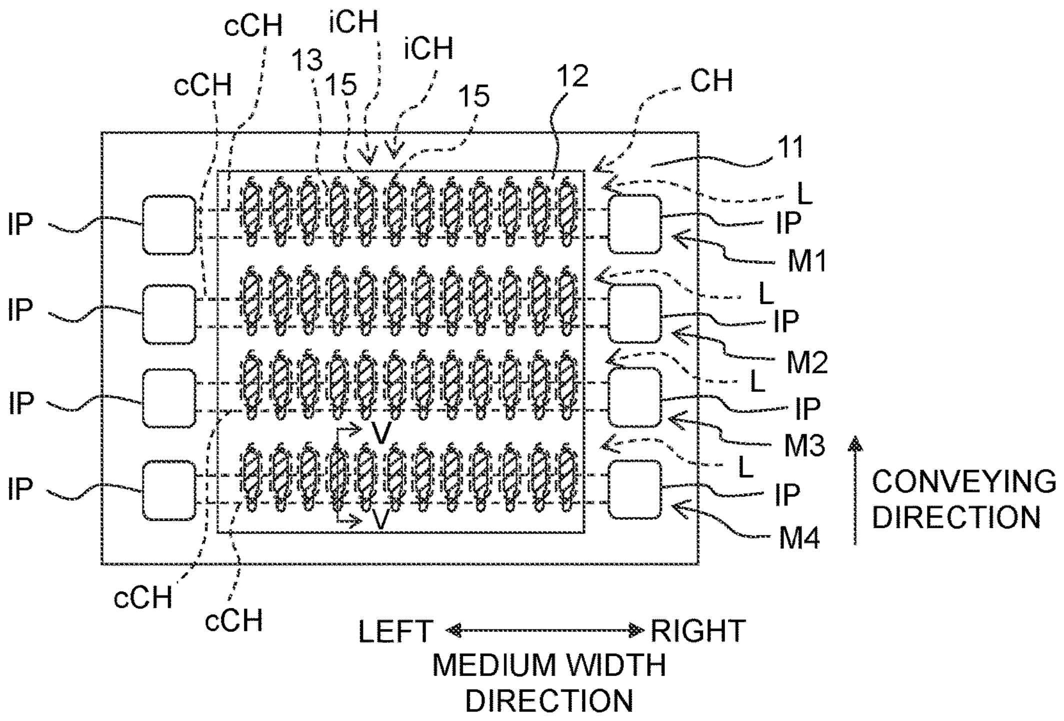
FIG. 4 is a top view depicting a channel member and an actuator member.
Figure 5:
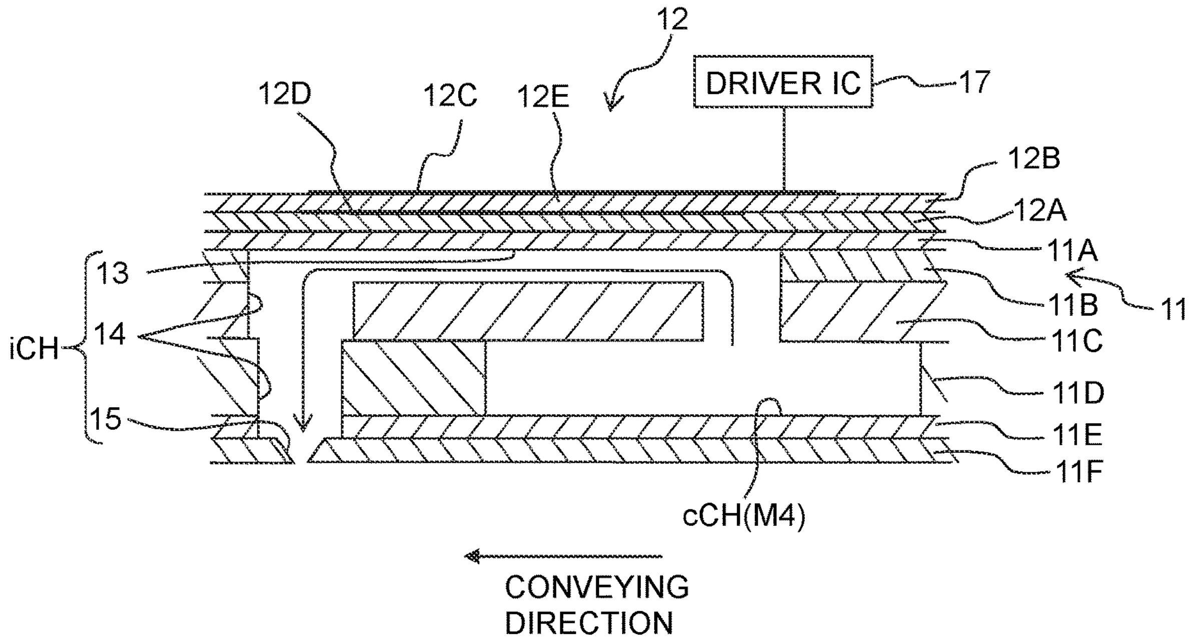
FIG. 5 is a cross-sectional view taken along a V-V line in FIG. 4.

As depicted in FIGS. 3 to 5, the head chip 10 is provided with a channel member 11, an actuator member 12, a driver IC 17 and a frame member 18.

[Channel Member 11]

As depicted in FIGS. 3 and 4, the channel member 11 is a plate-shaped member having a rectangular shape. As depicted in FIG. 5, the channel member 11 is construed by stacking an ink sealing film 11A, plates 11B to 11E and a nozzle plate 11F from the upper side in this order. As depicted in FIG. 4, a channel CH is formed in the channel member 11.

The channel CH includes four manifold channels M1, M2, M3 and M4 and 48 individual channels iCH. Each of the four manifold channels M1 to M4 includes a common channel cCH having a linear shape, and ink flow ports IP (inflow ports, discharge ports) which are provided on both end parts of the common channel cCH. 12 individual channels iCH are connected to each of the four manifold channels M1 to M4. Note that the number of the manifold channel and the number of the individual channel connected to each of the manifold channels are examples; the present teaching is not limited to or restricted by these numbers.

As depicted in FIG. 5, each of the individual channels iCH includes a pressure chamber 13, a descender channel 14 and a nozzle 15. An upper surface of the pressure chamber 13 is defined by the ink sealing film 11A. The descender channel 14 extends in the up-down direction from the pressure chamber 13 toward the nozzle 15. The nozzle 15 is a minute opening via which the ink is ejected toward the medium PM, and is formed in the nozzle plate 11F. As depicted in FIG. 4, four nozzle rows L are formed in a lower surface of the nozzle plate 11F. Each of the nozzle rows L extends along the direction in which the manifold channels M1 to M4 extend.

[Actuator Member 12]

As depicted in FIG. 4, the actuator member 12 has a rectangular outer shape which is one size smaller than the channel member 11. As depicted in FIG. 5, the actuator member 12 has a first piezoelectric layer 12A provided on an upper surface of the channel member 11, a second piezoelectric layer 12B located above the first piezoelectric layer 12A, a plurality of individual electrodes 12C provided on an upper surface of the second piezoelectric layer 12B, and a common electrode 12D sandwiched by the first piezoelectric layer 12A and the second piezoelectric layer 12B. Each of the first piezoelectric layer 12A and the second piezoelectric layer 12B is formed of a piezoelectric material composed primarily of lead zirconate titanate, etc. In the second piezoelectric layer 12B, an active part 12E sandwiched by the common electrode 12D and each of the plurality of individual electrodes 12C is polarized in a thickness direction. The plurality of individual electrodes 12C are formed in an upper surface of the second piezoelectric layer 12B so that each of the plurality of individual electrodes 12C is positioned above the pressure chamber 13 of one of the plurality of individual channels iCH. Each of the plurality of individual electrodes 12C is formed with a contact point electrically connectable to a FPC (Flexible Printed Circuit) 16 (see FIGS. 9 and 10). The driver IC 17 mounted on the FPC 16 is configured to selectively apply either one of a driving potential and a ground potential with respect to each of the plurality of individual electrodes 12C, based on a control of the controller CONT, via a wiring of the FPC 16. The common electrode 12D is electrically connectable to the FPC 16 via a through-electrode (not depicted in the drawings) which penetrates the second piezoelectric layer 12B in the thickness direction. The driver IC 17 mounted on the FPC 16 maintains the common electrode 12D at the ground potential via the wiring of the FPC 16 and the through-electrode. A plurality of piezoelectric elements is formed of the common electrode 12D, the plurality of individual electrodes 12C and a plurality of active parts 12E each of which is sandwiched between the common electrode 12D and one of the plurality of individual electrodes 12C.

[Driver IC 17]

Figure 9:
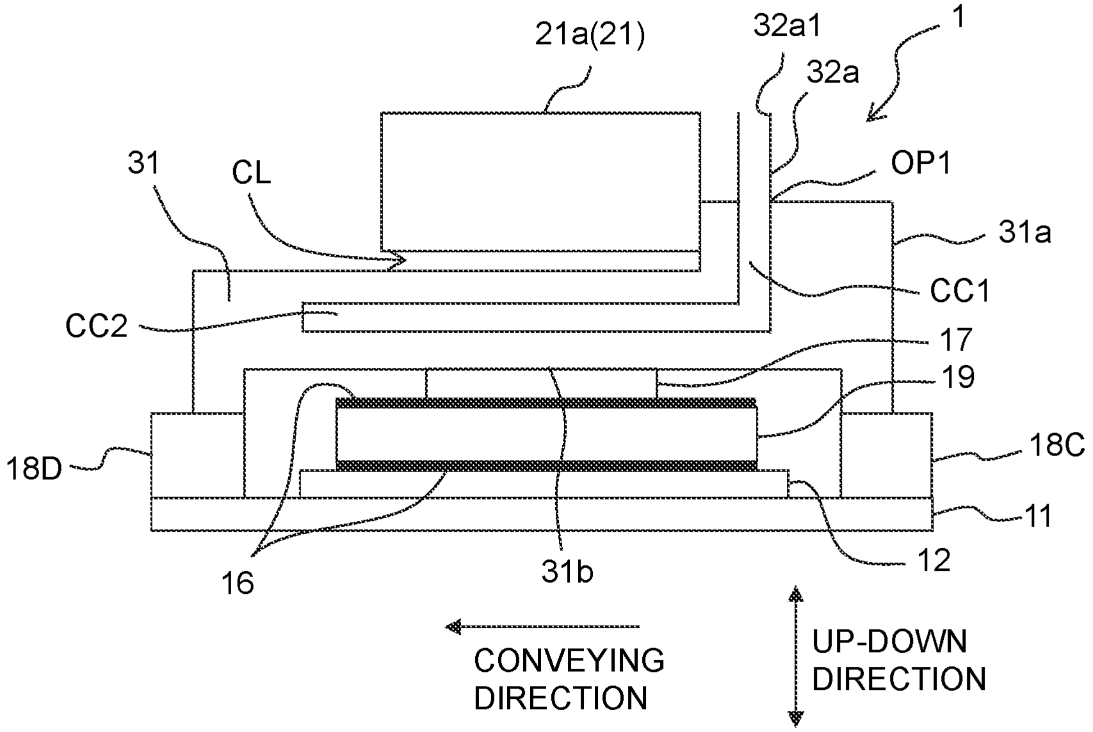
FIG. 9 is a cross-sectional view taken along IX-IX line of FIG. 8.
Figure 10:
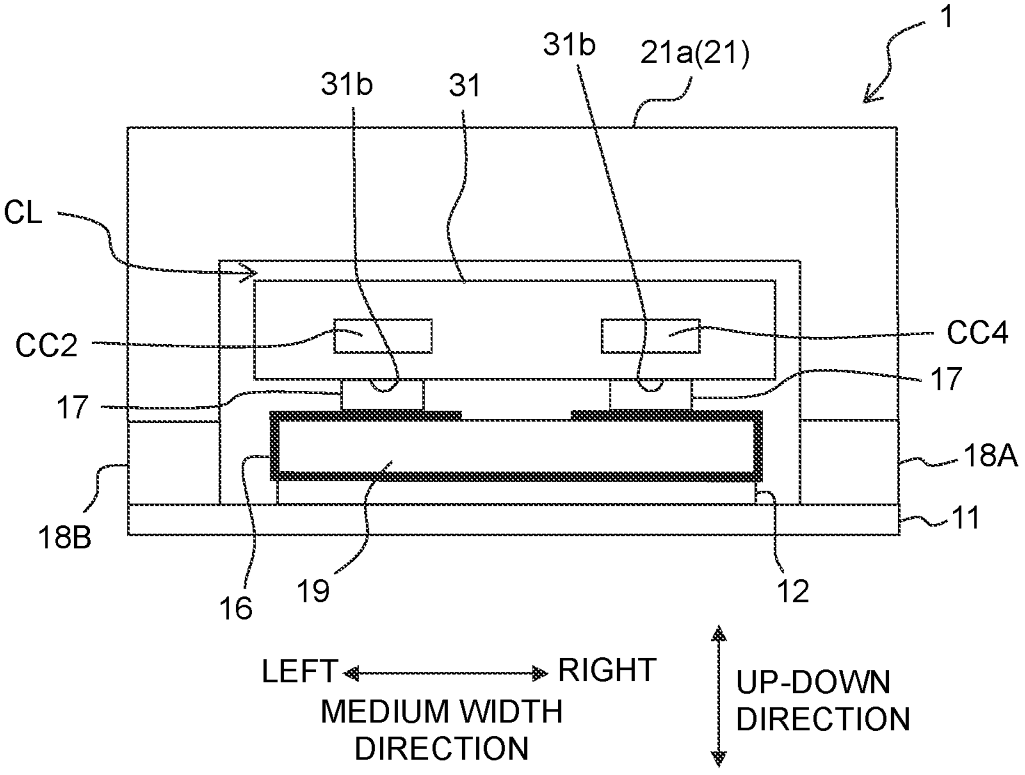
FIG. 10 is a cross-sectional view taken along X-X line of FIG. 8.

As depicted in FIGS. 9 and 10, an ejection controlling part constructed of a holding plate 19, the FPC 16 wound around the holding plate 19 and two driver ICs 17 mounted on the FPC 16 is positioned in an upper surface of the actuator member 12. A plurality of contact points (not depicted in the drawings), each of which is electrically connectable to one of a plurality of pieces of the contact point formed in the plurality of individual electrodes 12C of the actuator member 12, are formed in an outer surface of the FPC 16 (a surface not in contact with the holding plate 19), at a position facing the upper surface of the actuator member 12. Further, the two driver ICs 17 are mounted in the outer surface of the FPC 16 at a part thereof located above the holding plate 19.

Here, an explanation will be given about an operation of a piezoelectric element, of the plurality of piezoelectric elements, corresponding to one nozzle 15 of the plurality of nozzles 15, communicating with the manifold channel M4, with a case wherein a droplet of an ink (ink droplet) is ejected from the nozzle 15.

Before the printer 1000 starts a recording operation, the driving potential is applied to the plurality of individual electrodes 12C. In this situation, an electric field which is downward in the up-down direction acts in the active part 12E, of the second piezoelectric layer 12B, sandwiched between the common electrode 12D and an individual electrode 12C, of the plurality of individual electrodes 12, which corresponds to the nozzle 15, due to a difference in the potential between the individual electrode 12C and the common electrode 12D. In this situation, a polarization direction (downward in the up-down direction) of the active part 12E is coincident with the direction of the electric field, and the active part 12E expands in the thickness direction of the second piezoelectric layer 12B (up-down direction) and contracts in a plane direction of the second piezoelectric layer 12B. Accompanying with the contraction deformation of the active part 12E, a part of the first piezoelectric layer 12A and a part of the ink sealing film 11A which overlap with a pressure chamber 13, of the plurality of pressure chambers 13, which corresponds to the nozzle 15 in the up-down direction are deformed so as to project toward the pressure chamber 13 (are deformed to project downward). In this situation, the volume of the pressure chamber 13 is small, as compared with a case that the first piezoelectric layer 12A and the ink sealing film 11A are flat.

In a case that the printer 1000 starts the recording operation and that the ink is ejected from the nozzle 15, the potential of the individual electrode 12C corresponding to the nozzle 15 is switched from the driving potential to the ground potential. In this situation, since the difference in the potential between the individual electrode 12C and the common electrode 12D becomes small, the contraction of the active part 12E is canceled or released. With this, the part of the first piezoelectric layer 12A and the part of the ink sealing film 11A which overlap with the pressure chamber 13 in the up-down direction become the flat state. With this, the volume of the pressure chamber 13 becomes great, thereby pulling the ink into the pressure chamber 13 from the manifold channel M4.

Afterwards, the potential of the individual electrode 12C corresponding to the nozzle 15 is switched from the ground potential to the driving potential. In this situation, due to the difference in the potential between the individual electrode 12C and the common electrode 12D, the electric field which is downward same as the polarization direction of the active part 12E is generated in the active part 12E, which in turn causes the active part 12E to contract in the plane direction of the second piezoelectric layer 12B. With this, the part of the first piezoelectric layer 12A and the part of the ink sealing film 11A which overlap, in the up-down direction, with the pressure chamber 13 are deformed so as to project toward the pressure chamber 13 (are deformed to project downward). In this situation the volume of the pressure chamber 13 is decreased greatly, thereby applying large pressure to the ink inside the pressure chamber 13, and to cause the ink pulled into the pressure chamber 13 to be ejected, as an ink droplet, from the nozzle 15.

[Frame Member 18]

Figure 7:
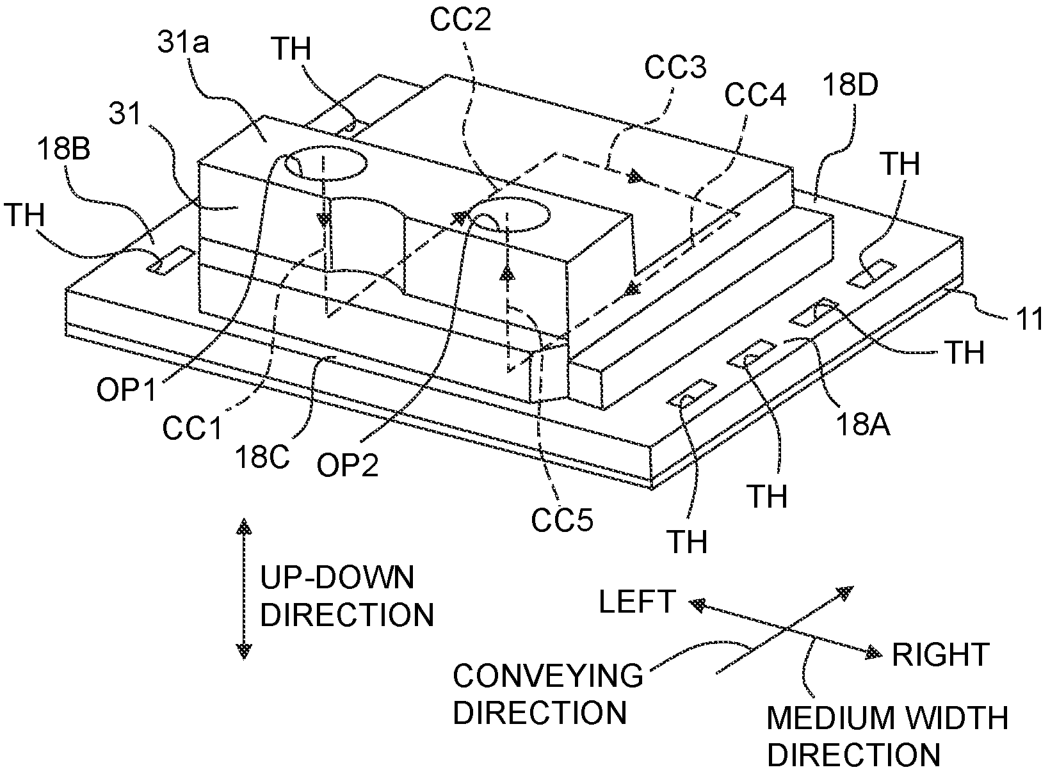
FIG. 7 is a perspective view depicting a state that an ink suppling device and a connecting pipe of a cooler are detached from the head module.

Next, the frame member 18 will be explained. The frame member 18 is a frame-shaped member which is joined to the upper surface of the channel member 11, and is formed by cutting out a central part of one piece of a plate-shaped member. As depicted in FIG. 7, the frame member 18 has sides 18A and 18B which face (are opposite to) each other in the medium width direction, and sides 18C and 18D which face each other in the conveying direction. Each of the sides 18A and 18B extends along the conveying direction. The side 18C extends along the medium width direction from an end part on the upstream side in the conveying direction of the side 18A up to an end part on the upstream side in the conveying direction of the side 18B. The side 18D extends along the medium width direction from an end part on the downstream side in the conveying direction of the side 18A up to an end part on the downstream side in the conveying direction of the side 18B. As depicted in FIGS. 3 and 7, a size of an outer edge of the frame member 18 is substantially same as a size of an outer edge of the channel member 11. On the other hand, a size of an inner edge of the frame member 18 is one size greater than a size of an outer edge of the actuator member 12. Further, in a state that the frame member 18 is joined to the upper surface of the channel member 11, the entirety of the actuator member 12 is positioned on the inner side with respect to the inner edge of the frame member 18. As depicted in FIG. 7, each of the sides 18A and 18B of the frame member 18 is formed with four through holes TH corresponding, respectively, to the ink flow ports IP of the channel member 11. Each of the through holes TH penetrates through the frame member 18 in the up-down direction, and overlaps in the up-down direction with one of the ink flow ports IP, of the channel member 11, corresponding thereto. Namely, each of the through holes TH is communicated with one of the ink flow ports IP, of the channel member 11, corresponding thereto. The sides 18A and 18B of the frame member 18 are examples, respectively, of a “second side” and a “third side”

of the present teaching. Further, one of the through holes TH formed in the side 18A is an example of a "first connecting port" of the present teaching, and one of the through holes TH formed in the side 18B is an example of a "second connecting port" of the present teaching.

[Ink Supplying Device 20]

The ink supplying device 20 is a member in which an ink supplying channel configured to supply the ink supplied from the sub tank 700 to the head chips 10 and an ink recovering channel configured to recover the ink from the head chips 10 and return the ink to the sub tank 700 are formed. As described above, the ink supplied from the sub tank 700 is heated by the heater, and the ink supplying device 20 supplies the heated ink to the head chips 10. As depicted in FIG. 3, the ink supplying device 20 is provided with a main body part 21 and two projecting parts 22 and 23. The main body part 21 has an outer shape substantially rectangular parallelepiped which is long in the medium width direction and in the up-down direction. Each of the two projecting parts 22 and 23 has an outer shape which is substantially rectangular parallelepiped. The projecting part 22 is positioned at a lower end part and a one end part in the medium width direction of the main body part 21, and the projecting part 23 is positioned at the lower end part and the other end part in the medium width direction of the main body part 21. As seen from the upper side, each of the projecting parts 22 and 23 projects, from the main body part 21, toward the upstream side and the downstream side in the conveying direction.

Figure 8:
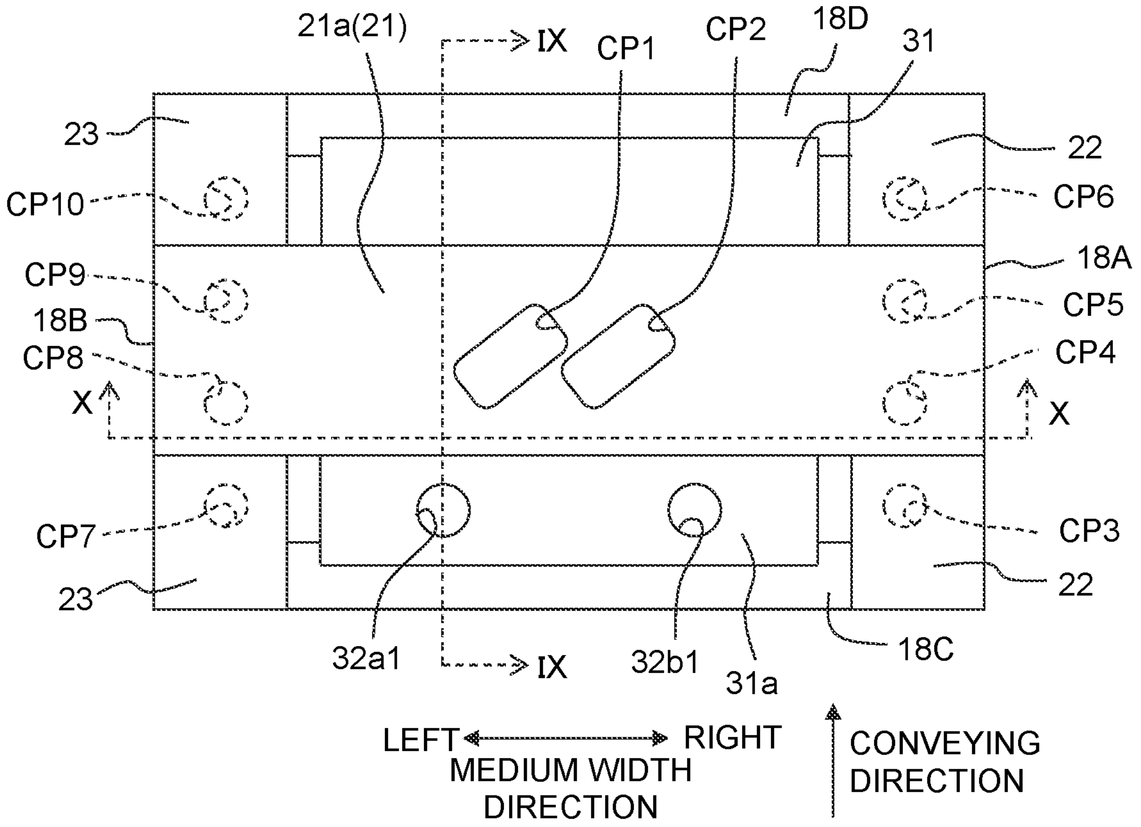
FIG. 8 is a top view of the head module.

As depicted in FIGS. 3 and 8, an upper wall 21*a* of the main body part 21 is formed with a supply port CP1 and a recovery port CP2. Each of the supply port CP1 and the recovery port CP2 has a substantially rectangular shape. The supply port CP1 and the recovery port CP2 are arranged side by side in the medium width direction so that long sides of each of the supply port CP1 and the recovery port CP2 are inclined at a same angle with respect to the conveying direction. The supply port CP1 is communicated with the sub tank 700 via an ink supplying tube (not depicted in the drawings) and the recovery port CP2 is communicated with the sub tank 700 via an ink recovering tube (not depicted in the drawings). The supply port CP1 is an example of an "upstream end of an ink supply channel" of the present teaching.

Figure 6:
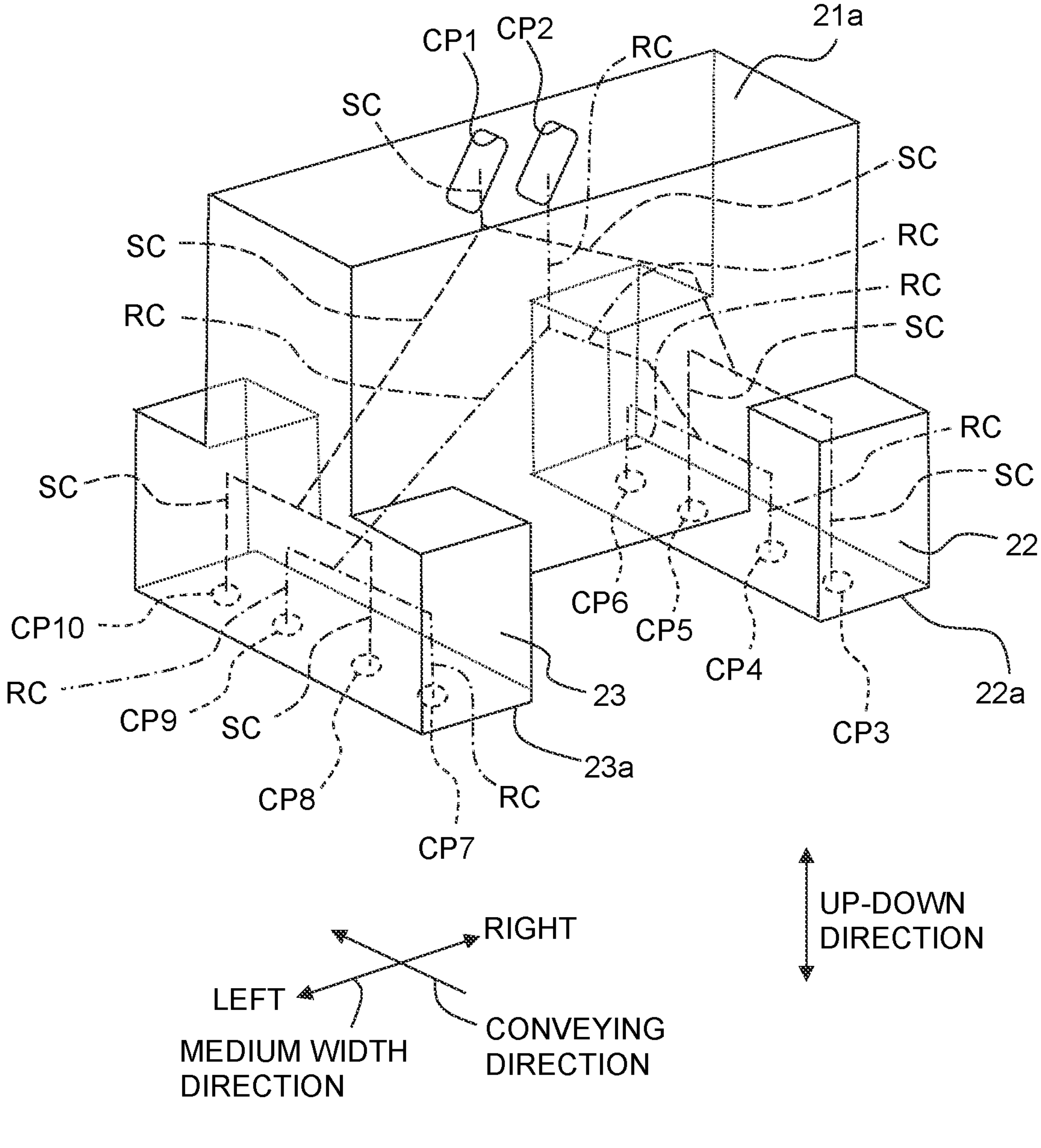
FIG. 6 is a view for explaining a flow of ink inside the channel member.

As depicted in FIG. 6, a bottom wall 22*a* of the projecting part 22 is formed with four flow ports CPC3 to CP6 which are arranged side by side in the conveying direction. Each of the four flow ports CP3 to CP6 corresponds to one of the four through holes TH formed in the side 18A of the frame member 18. Similarly, a bottom wall 23*a* of the projecting part 23 is formed with four flow ports CPC7 to CP10 which are arranged side by side in the conveying direction. Each of the four flow ports CP7 to CP10 corresponds to one of the four through holes TH formed in the side 18B of the frame member 18. The bottom wall 22*a* of the projecting part 22 is joined to the side 18A of the frame member 18, and the four flow ports CP3 to CP6 are communicated, respectively, with the four through holes TH formed in the side 18A. Similarly, the bottom wall 23*a* of the projecting part 23 is joined to the side 18B of the frame member 18, and the four flow ports CP7 to CP10 are communicated, respectively, with the four through holes TH formed in the side 18B.

Furthermore, as depicted in FIG. 6, an ink supply channel SC configured to cause the supply port CP1 to communicate with the four flow ports CP3, CP5, CP8 and CP10 and ink recovery channel RC configured to cause each of the four flow ports CP4, CP6, CP7 and CP9 to communicate with the recovery port CP2 are formed in the ink supply device 20. Note that in FIG. 6, the ink supply channel SC is indicated by broken lines, and the ink recovery channel RC is indicated by one-dot chain lines.

The ink supplied to the supply port CP1 reaches the four flow ports CP3, CP5, CP8 and CP10 via the ink supply channel SC, and flows into the four manifold channels M4, M2, M3 and M1 via the four through holes TH in the frame member 18 and the four ink flow ports (inflow ports) IP of the channel member 11 each of which communicates with one of the four flow ports CP3, CP5, CP8 and CP10. The ink flowed into the manifold channels M4 and M2 advances leftward in each of the manifold channels M4 and M2 along the medium width direction, and reaches the ink flow port (discharge port) IP. On the other hand, the ink flowed into the manifold channels M3 and M1 advances rightward in each of the manifold channels M3 and M1 along the medium width direction, and reaches the ink flow port (discharge port) IP. The ink reaching the four ink flow ports (discharge ports) IP flows into the four flow ports CP7, CP9, CP4 and CP6 of the ink supply device 20 via the four through holes TH, of the frame member 18, each of which communicate with one of the four ink flow ports (discharge ports) IP. Then, the ink flowed into the four flow ports CP7, CP9, CP4 and CP6 is recovered by the sub tank 700 via the ink recovery route RC and the recovery port CP2.

[Cooler 30]

As depicted in FIG. 3, the cooler 30 is provided with a main body 31 and a linking part 32. The main body 31 is positioned above the frame member 18 and is positioned between the two projecting parts 22 and 23 of the ink supplying device 20 in the medium width direction. The linking part 32 is provided with two linking tubes 32*a* and 32*b*.

As depicted in FIG. 7, the main body 31 is a member having a rectangular shape in a plan view, and has a projecting part 31*a* which projects upward at an end part, of the main body 31, on the upstream side in the conveying direction. Circular openings OP1 and OP2 are formed in an upper surface of the projecting part 31*a*. The openings OP1 and OP2 have a same size (diameter) and are arranged side by side in the medium width direction. Further, a circulation channel is formed, by five channels CC1 to CC5, in the main body 31, the circulation channel starting from the opening OP1 and arriving at the opening OP2. Note that in FIG. 7, each of the channels CC1 to CC5 is depicted in broken lines. The channel CC1 extends downward from the opening OP1. The channel CC2 extends, along the conveying direction, from a lower end of the channel CC1 toward the downstream side in the conveying direction. The channel CC3 extends rightward, along the medium width direction, from a downstream end in the conveying direction of the channel CC2. The channel CC4 extends, along the conveying direction, from a right end of the channel CC3 toward the upstream side in the conveying direction. Further, the channel CC5 extends upward, from an upstream end in the conveying direction of the channel CC4, and up to the opening OP2.

As depicted in FIG. 3, each of the linking tubes 32*a* and 32*b* of the linking part 32 is a tube extending linearly in the up-down direction. The size and the shape of the linking tube 32*a* are same as the size and the shape of the linking tube 32*b*. Further, the shape of a cross-section orthogonal to the up-down direction of each of the linking tubes 32*a* and 32*b* is circular. An upper end 32*a*1 of the linking tube 32*a* is connected to the coolant supplying tube of the cooling mechanism 800, and a lower end 32*a*2 of the linking tube 32*a* is connected to the opening OP1 of the main body 31.

An upper end **32*b*1 of the linking tube 32*b* is connected to the coolant recovering tube of the cooling mechanism 800, and a lower end 32*b*2 of the linking tube 32*b* is connected to the opening OP2 of the main body 31. The upper end 32*a*1 of the linking tube 32*a* is an example of an "upstream end of the coolant channel" of the present teaching, and the upper end 32*b*1 of the linking tube 32*b* is an example of a "downstream end of the coolant channel" of the present teaching. Further, the linking tubes 32*a* and 32*b*, and the channels CC1 to CC5 of the main body 31** are each an example of the "coolant channel" of the present teaching.

The cooling water is supplied from the coolant tank of the cooling mechanism 800 to the linking tube **32*a* of the cooler 30, via the coolant supplying tube. Further, the cooling water which has flowed downward in the linking tube 32*a* is supplied to the main body 31 from the opening OP1. The cooling water supplied to the main body 31 is flows from the opening OP1 up to the opening OP2 in the order of: the channels CC1, CC2, CC3, CC4 and CC5 formed in the main body 31. Afterwards, the cooling water flows into the linking tube 32*b* from the opening OP2, and flows upward in the linking tube 32*b*. Then, the cooling water which has flowed through the linking tube 32*b* is recovered to the coolant tank via the coolant recovering tube of the cooling mechanism 800**.

As depicted in FIGS. 8 and 9, both end parts in the conveying direction of the main body 31 are in contact with the sides 18C and 18D of the frame member 18. Specifically, the both end parts in the conveying direction of the main body 31 are fixed to the sides 18C and 18D of the frame member 18. Owing to this, it is possible to absorb, via the frame member 18, a heat generated by the driving of the piezoelectric elements. On the other hand, the cooler 30 is not in contact with the sides 18A and 18B, in the frame member 18, in each of which the through holes TH via which the ink flows are formed. Owing to this, it is possible to prevent the heat of the ink flowing through the through holes TH of the frame member 18 from being transferred to the cooler 30 via the frame member 18, thereby preventing the temperature of the ink from being lowered.

Further, as depicted in FIGS. 9 and 10, contacting parts **31*b* each of which is in thermal contact with one of the two driver ICs 17 are formed in the lower surface of the main body 31. Namely, the cooler 30 is in thermal contact with the two driver ICs 17. Note that the phrase "thermal contact" includes not only direct contact but also contact via a heat transferrable member. A case that a space is present between two members, namely, a case that the two members are not in contact with each other, and a case that another member is positioned between the two members and that the another member is not in contact with both of the two members are not included in the case of "thermal contact". Further, the channels CC2 and CC4 extend along the conveying direction at a location above the two contacting parts 31*b*. Namely, the channels CC2 and CC4 are positioned above the two driver ICs 17. Owing to this, it is possible to cause the cooling water flowing through the channels CC2 and CC4 to effectively absorb the heat generated from the two driver ICs 17. Furthermore, the main body part 21 of the ink supplying device 20 is positioned further above the channels CC2 and CC4. Namely, the channels CC2 and CC4 overlap with the main body part 21 of the ink supplying device 20 in the up-down direction; the two driver ICs 17 and the main body part 21 of the ink supplying device 20 are separated from each other in the up-down direction, with the channels CC2 and CC4 being interposed or sandwiched therebetween in the up-down direction. Owing to this, it is possible to cause the heat generated from the two driver ICs 17 to be absorbed by the cooling water flowing through the channels CC2 and CC4, thereby preventing the heat from being transferred to the ink flowing in the main body part 21 of the ink supplying device 20**.

Further, as depicted in FIG. 8, the ink supplying device 20 and the cooler 30 are partially overlapped, in a case that the head module 1 is seen from thereabove. Owing to this, the head module 1 can be miniaturized in the conveying direction and the medium width direction, as compared with a case that the ink supplying device 20 and the cooler 30 are not overlapped in the up-down direction. Furthermore, since the ink supplying device 20 and the cooler 30 are positioned so as not to cross over (extend beyond) the outer edge of the frame member 18, the size in the conveying direction and the size in the medium width direction of the head module 1 are not made great to such an extent of extending beyond the outer edge of the frame member 18. Moreover, the supply port CP1 and the recovery port CP2 of the ink supplying device 20 and the upper end **32*a*1 of the linking pipe 32*a* and the upper end 32*b*1 of the linking pipe 32*b* are positioned on the inner side with respect to the outer edge of the frame member 18 and are opened upward. Owing to this, in a state that the supply port CP1 and the recovery port CP2 of the ink supplying device 20 are connected, respectively, to the ink supplying tube and the ink recovering tube and that the linking pipe 32*a* and the linking pipe 32*b* of the cooler 30 are connected, respectively, to the coolant supplying tube and the coolant recovering tube, the connecting parts of each of the ink supplying device 20 and the cooler 30 are positioned on the inner side with respect to the outer edge of the frame member 18. Owning to this, it is possible to contribute to the decreasing of the size in the conveying direction and the size in the medium width direction of the head module 1. Further, by decreasing the size in the conveying direction and the size in the medium width direction of each of the plurality of head modules 1, it is possible to reduce any restriction in positioning the plurality of head modules 1** in the staggered manner in the holding member HM.

Further, as depicted in FIGS. 9 and 10, a clearance CL is defined between the upper surface of the main body 31 of the cooler 30 and the lower surface of the main body part 21 of the ink supplying device 20. In other words, the air is intervened between the upper surface of the main body 31 of the cooler 30 and the lower surface of the main body part 21 of the ink supplying device 20. With this, the cooler 30 and the ink supplying device 20 are thermally isolated from each other. Namely, the upper surface of the main body 31 of the cooler 30 and the lower surface of the main body part 21 of the ink supplying device 20 are separated from each other approximately by several millimeters in the up-down direction so that the heat of the heated ink flowing in the main body part 21 of the ink supply device 20 is not transferred to the main body 31 of the cooler 30. Note that the width in the up-down direction of the clearance CL is preferably less than 1 cm from the viewpoint of making the head module 1 small-sized. Since the cooler 30 and the ink supplying device 20 are thermally isolated from each other, it is thereby possible to prevent any lowering in the temperature of the ink flowing in the main body part 21 of the ink supplying device 20, and to precisely control the temperature of the ink. As a result, it is possible to uniformize the volumes of the ink droplets ejected from the plurality of nozzles 15 and to suppress any unevenness in the density of an image printed on the medium PM.

[Modifications]

In the foregoing, although the present embodiment of the present teaching has been explained, the present teaching is not limited to the above-described embodiment, and various design changes can be made within the scope of the claims.

In the above-described embodiment, although the ink is recovered from the head module 1 to the sub tank 700, it is allowable that the ink is not recovered. In this case, the variety of kinds of channels provided on the head module 1 and configured to recover the ink is not necessary.

In the above-described embodiment, although the cooling water is used as the coolant, it is allowable to use a cooling liquid different from water; it is allowable to use a cooled air as the coolant.

In the above-described embodiment, although the air is present in the clearance CL between the upper surface of the main body 31 of the cooler 30 and the lower surface of the main body part 21 of the ink supplying device 20, the present teaching is not limited to this. It is allowable, for example, that a heat insulating member made of a solid such as rubber is filled in the clearance CL. Alternatively, it is allowable, for example, that a heat insulating member in which an inert gas such as krypton gas, argon gas, etc., is sealed therein is filled in the clearance CL.

Although the printer 1000 in the above-described embodiment is the printer of the so-called line system provided with the head units 100 of the line type, the present teaching is not limited to this. For example, it is allowable to apply the present teaching to a printer of a so-called serial system in which the ink(s) is (are) ejected from the plurality of nozzles 15 to the medium PM while moving the head module 1 in a scanning direction together with a carriage.

The liquid ejected from the nozzles 15 is not limited to the ink, and may be any liquid different from the ink (for example, a treatment liquid which agglutinates or precipitates a component in the ink, etc.).

The medium PM may be, for example, paper, cloth (fabric), a resin member, etc.

The above-described embodiment and the modifications thereof are merely examples in view of all the points, and should be considered to be not intended to limit or restrict the present teaching in any way. For example, the number, the configuration, etc., of the head unit 100 may be changed. There is also no limitation to the number of the color which is printable by the printer 1000 at a time, and the printer 1000 may have a configuration capable of performing only a single color printing. Further, the number, shape, position, etc., of the variety of kinds of channels may also be changed appropriately.

What is claimed is:

1. A head module, comprising:

a head chip having a nozzle plate and an IC;

a cooler which is in thermal contact with the IC and which is configured to cool the IC; and a supplying device fluidly connected to the head chip and configured to supply ink to the head chip, the supplying device having a main body part, a first projecting part and a second projecting part, wherein in a first direction orthogonal to the nozzle plate, the cooler and the supplying device are positioned on one side with respect to the nozzle plate, the cooler and the main body part of the supplying device are overlapped with each other as seen from the first direction, the cooler and the first projecting part are not overlapped with each other as seen from the first direction, the cooler and the second projecting part are not overlapped with each other as seen from the first direction, the cooler is positioned between the first projecting part of the supplying device and the second projecting part of the supplying device in a second direction orthogonal to the first direction, and the cooler and the main body part of the supplying device are thermally isolated from each other.

2. The head module according to claim 1, wherein a clearance is defined between the cooler and the main body part of the supplying device.

3. The head module according to claim 1, wherein the cooler has a coolant channel through which coolant flows.

4. The head module according to claim 3, wherein the cooler has a contacting part which is in thermal contact with the IC, and the contacting part is overlapped with the main body part of the supplying device as seen from the first direction.

5. The head module according to claim 4, wherein the head chip comprises a first connecting port connected to the supplying device, the ink being supplied from the supplying device to the head chip via the first connecting port, the head chip has a rectangular outer shape, the cooler is fixed to a first side of the head chip, and the first connecting port is positioned in a second side of the head chip.

6. The head module according to claim 5, wherein the cooler and the supplying device are positioned so as not to cross over an outer edge of the head chip as seen from the first direction.

7. The head module according to claim 5, wherein the head chip further has a second connecting port connected to the supplying device, the ink being supplied from the supplying device to the head chip via the second connecting port, and the second connecting port is positioned in a third side of the head chip.

8. The head module according to claim 7, wherein the second side and the third side of the head chip face each other.

9. The head module according to claim 5, wherein the supplying device comprises an ink supplying channel through which the ink is supplied to the head chip, and as seen from the first direction, an upstream end of the ink supplying channel and an upstream end and a downstream end of the coolant channel are positioned on an inner side with respect to an outer edge of the head chip and are opened toward the one side in the first direction.

10. The head module according to claim 9, wherein the upstream end of the ink supplying channel and each of the upstream end and the downstream end of the coolant channel are different in a shape of a cross section which is orthogonal to the first direction.

11. The head module according to claim 5, wherein in a cross section which is orthogonal to the nozzle plate and which is parallel to the second side of the head chip, the coolant channel is positioned on the one side in the first direction with respect to the IC and the supplying device is positioned on the one side in the first direction with respect to the coolant channel.

12. The head module according to claim 1, wherein the supplying device comprises: an ink supplying channel through which the ink is supplied to the head chip; and an ink recovering channel through which the ink is recovered from the head chip.

13. The head module according to claim 1, wherein the ink supplied from the supplying device to the head chip is heated by a heater.

14. The head module according to claim 1, wherein the first projecting part of the supplying device has a first flow port through which the ink is supplied to the head chip and a second flow port through which the ink is recovered from the head chip, the second projecting part of the supplying device has a third flow port through which the ink is supplied to the head chip and a fourth flow port through which the ink is recovered from the head chip, the main body part of the supplying device has a supply port and a recovery port, the supply port communicating with the first flow port and the third flow port, the recovery port communicating with the second flow port and the fourth flow port.

15. The head module according to claim 14, wherein the head chip has a first manifold and a second manifold, the ink is supplied to the first manifold through the first flow port and recovered from the first manifold thorough the fourth flow port, the ink is supplied to the second manifold through the third flow port and recovered from the second manifold through the second flow port, and a direction in which the ink flows in the first manifold and a direction in which the ink flows in the second manifold are opposite to each other.

16. The head module according to claim 1, wherein in the second direction, each of the first projecting part of the supplying device and the second projecting part of the supplying device is shorter than the main body part of the supplying device.

17. The head module according to claim 1, wherein in a third direction orthogonal to the first direction and the second direction, each of the first projecting part of the supplying device and the second projecting part of the supplying device is longer than the main body part of the supplying device.

* * * * *